United States Patent Office 3,170,901
Patented Feb. 23, 1965

3,170,901
NOVEL QUATERNARY AMMONIUM COMPOUNDS AND POLYMERS THEREOF
Sidney Melamed, Elkins Park, Pa., and Ruth H. Shimizu, San Francisco, Calif., assignors to Rohm & Haas Company, Philadelphia, Pa., a corporation of Delaware
No Drawing. Filed Dec. 27, 1960, Ser. No. 78,208
11 Claims. (Cl. 260—89.7)

This invention relates to new monomeric and polymeric quaternary ammonium compounds and to their production. It is particularly concerned with the production of monomers and polymers, either homopolymers or copolymers, comprising units containing in a branch thereon quaternary ammonium nitrogen to which is attached a radical containing carbonamide groups, which polymers are water-soluble or readily water-dispersible but by virtue of the amido groups are convertible to an insoluble condition. This application is a continuation-in-part of our copending application Serial No. 495,784, filed March 21, 1955, now U.S. Patent 3,008,851.

Such polymers have a wide variety of uses as will be pointed out more particularly hereinafter. They are particularly useful as adjuvants to paper for imparting increased wet strength and as agents for impregnating or coating textiles for various purposes. Because of the fact that they are readily converted to insoluble condition after incorporation in the paper or textile, they may be rendered resistant to removal therefrom during subsequent wetting, washing or scouring operations.

The polymeric compounds of the present invention are water-soluble or easily water-dispersible addition polymers of monoethylenically unsaturated monomers comprising at least 5 mole percent, and preferably at least 30 mole percent, of at least one monomer of the present invention having the formula:

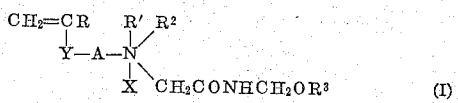
(I)

where R is hydrogen or methyl, Y is O, —CONR—, —COO—.

A is a straight-chain or branched chain alkylene group having 2 to 10 carbon atoms which may be substituted by one or more hydroxyl groups, at least two of the carbon atoms thereof being connected in a chain between the N atom and Y group of the formula, R' and R² may be (1) separate groups selected individually from the group consisting of saturated and ethylenically unsaturated hydrocarbon groups of 1 to 4 carbon atoms, and (2) a single group selected from the morpholino residue: $(CH_2H_4)_2O$, the pyrrolidino residue —$C_4H_8$—, the piperidino residue —$C_5H_{10}$—, and an N-alkyl piperazine residue :$(C_2H_4)_2$:$NR^4$ where $R^4$ is an alkyl group of 1 to 18 carbon atoms, such as methyl, ethyl, isopropyl, X is a halogen, preferably chlorine, and $R^3$ is an alkyl group having 1 to 5 carbon atoms.

The invention is not only concerned with the novel polymers herein disclosed but also with the monomers of the formula

(II)

wherein A, R, R', R², R³, and Y have the definitions given hereinabove.

An essential characteristic of the polymers of the invention is their capability of being cured to an insoluble condition and this is attributable to the —$CH_2OR^3$ substituent. This substituent renders the polymer convertible to an insoluble condition on heating in the presence of an acidic catalyst.

The polymers may contain up to 70% by weight of one or more other comonomers such as acrylonitrile, the vinyl aromatic compounds, more particularly the vinyl aromatic hydrocarbons (e.g., styrene, isopropenyl toluene, the various dialkyl styrenes, etc.), other aliphatic compounds containing a $CH_2$=C= grouping, e.g. the various substituted acrylonitriles (e.g., methacrylonitrile, ethacrylonitrile, phenylacrylonitrile, etc.), acrylamide and the various substituted acrylamides (e.g., methacrylamide, ethacrylamide, the various N-substituted acrylamides which are different from those used in practicing the present invention and the various N-sustituted alkacrylamides, for instance N-methylol acrylamide, N-monoalkyl and -dialkyl acrylamides and methacrylamides, e.g. N-monomethyl, -ethyl, -propyl, -butyl, etc. and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), vinyl esters, e.g., vinyl acetate, vinyl propionate, vinyl butyrate, vinyl isobutyrate, vinyl valerate, etc., esters of an acrylic acid (including acrylic acid itself and the various α-substituted acrylic acids, e.g., methacrylic acid, ethacrylic acid, phenylacrylic acid, etc.), more particularly the alkyl esters of an acrylic acid, e.g., the ethyl, propyl, isopropyl, n-butyl, sec-butyl, tert-butyl, amyl, hexyl, heptyl, octyl, decyl, dodecyl, etc. esters of acrylic, methacrylic, ethacrylic, phenylacrylic, etc. acids, vinyl ethers, such as butyl vinyl ether, N-vinyl compounds such as N-vinyl pyrrolidone, and olefins, such as ethylene, fluorinated vinyl compounds, such as vinylidene fluoride, as well as other vinyl aromatic and vinyl aliphatic compounds, and other compounds containing a single $CH_2$=C= grouping.

If the polymer contains less than 30 mole percent of quaternary nitrogen containing units of Formula I, it preferably contains enough additional quaternary nitrogen containing units of other types to provide a total of at least 30 mole percent of quaternary nitrogen containing groups. Examples of other such units are those having the formula

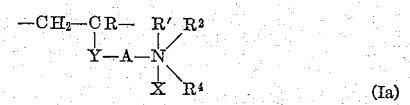
(Ia)

where the symbols have the same definition as before and $R^4$ may be benzyl, cyclohexyl, or an alkyl group having 1 to 4 carbon atoms.

Those polymers of the invention in which the R' and $R^2$ groups are saturated may be made by first polymerizing or copolymerizing an amine having the formula

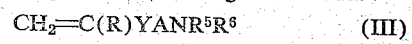
(III)

where R, Y and A are the same as defined above and $R^5$ and $R^6$ may be (1) separate groups selected individually from the group consisting of saturated hydrocarbon groups of 1 to 4 carbon atoms, and (2) a single group selected from the morpholino residue :$(C_2H_4)_2O$, the pyrrolidino residue —$C_4H_8$—, the piperidino residue —$C_5H_{10}$—, and an N-alkyl piperazino residue

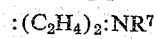

where $R^7$ is an alkyl group of 1 to 18 carbon atoms, such as methyl, ethyl, isopropyl. Then in the polymer thereby obtained part or all of the tertiary nitrogen groups are quaternized by means of an alkylating agent of the formula $XCH_2CONHCH_2OR^3$, with or without an alkylating agent $R^4X$, to provide at least 30% by weight of quaternized monomeric units in the polymer including at least 5 mole percent of units having the Formula I.

An alternate procedure to produce the polymers of the present invention in which R' and R² are saturated is to quaternize corresponding monomers of Formula III with XCH₂CONHCH₂OR³, with or without R⁴X, or one of such monomers with XCH₂CONHCH₂OR³ and another with R⁴X, and then to polymerize or copolymerize the quaternary ammonium compounds obtained which have the formulas:

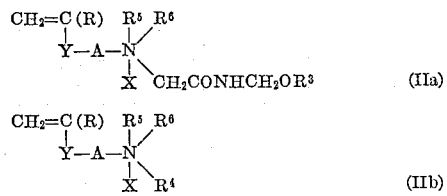

where the symbols have the same definitions as before.

Any known procedure for polymerizing the compounds may be employed either for polymerizing the amine or amines before quaternization or for polymerizing the quaternized monomer or monomers. For example, various free radical catalysts may be used such as hydrogen peroxide, organic peroxide, such as butyl perbenzoate or benzyl peroxide or azo catalysts such as azodiisobutyronitrile. Such catalysts may be employed for polymerization in bulk or in solution. On the other hand, if polymerization is to be effected in emulsions or dispersions of the monomers, ammonium persulfate or alkali metal persulfates may be employed. Polymerization may be effected at 60° to 100° C. and the amount of catalyst or initiator may be from 0.1% to about 20% by weight of the monomer or monomers. Polymerization may be carried out in an inert atmosphere such as nitrogen.

The quaternization of the monomer or monomers, or of the polymer is preferably effected in a polar solvent such as water, ethanol, acetonitrile, dimethylformamide, or glycol ethers such as ethoxyethyl hydroxyethyl ether or mixtures of one of these solvents with benzene or toluene at a temperature of 60° C. to 100° C. for a period of about two to twelve hours. The alkylating agent XCH₂CONHCH₂OR³ may be used in a quantity that is molarly equivalent to the total number of amine groups in the polymer to quaternize all of such groups. However, when there is more than 5 mole percent of the monomeric units containing a quaternizable amine group, it is unnecessary to quaternize all of such amine groups and the amount of quaternizing agent may be less than the amount required to quaternize all of the amine groups in the polymer provided sufficient is used to provide 5 mole percent of quaternized monomeric units having Formula I in the final polymer.

The molecular weight of the final quaternized polymer is not critical. It may vary from as few as 10 monomeric units to a molecular weight of the order of 500,000 or more.

An alternative procedure for producing polymers in which Y is —CONR— is to aminolyze polymers of an ester of acrylic or methacrylic acid, preferably poly(methyl acrylate) or a copolymer of at least 5 mole percent, and preferably at least 30 mole percent of methyl acrylate, by means of at least one amine of the formula:

$$\text{HNRANR'R}^2 \qquad (IV)$$

where the symbols are the same as defined above. Generally, aminolysis is performed in a medium which is anhydrous or contains but little water unless considerable carboxyl groups are desired in the final polymeric product. The amine or amine mixture itself may serve as the solvent as well as the reactant for aminolyzing the polymerized methyl acrylate and aminolysis may be effected at temperatures of 90° to 130° C. in a time of 96 hours to 24 hours respectively, the time required generally being inversely proportional to the temperature. In the presence of a 3-to-4 fold excess of amine, complete aminolysis may be effected in the times and the temperatures just mentioned, and it has been found that the higher the temperature employed, the higher is the final molecular weight of polymer obtained. A catalyst to accelerate the reaction is unnecesary, but an alkoxide, such as sodium methoxide, sodium ethoxide, or the like, may be used in amounts of from ½% to 20% by weight of the polymer. With a catalyst, an amount of the amine or amine mixture equivalent to the ester groups to be aminolyzed may be dissolved in a solvent such as toluene or additional amine, either the same or different, or an alcohol, such as methanol, ethanol, or butanol, and the complete aminolysis may be obtained in eight hours at a temperature of 80° to 90° C. An advantageous system is to start in toluene in which the polymerized ester is soluble and during the reaction to add an alcohol such as methanol, ethanol, or butanol in which the aminolyzed polymer is soluble, and subsequently to remove the solvent to obtain the final polymer.

The polymeric esters of alcohols other than methyl, such as of ethyl alcohol, propyl alcohol, butyl alcohol, and so on, require an increase in the time and temperature factor to produce a corresponding conversion of ester groups to amido groups in the polymer. Generally, when an amine used contains a primary nitrogen atom, it is necessary to maintain the reaction medium containing the polymeric ester and amine at a temperature below 130° C. in order to avoid imide formation with consequent cross-linking and insolubilization of the final polymer. However, when the aminolysis is effected by amines containing secondary nitrogen atoms but no primary nitrogen atom, there is no possibility of cross-linking or imide formation so that higher temperatures may be used up to 180° to 200° C.

Polymerized esters of the unsaturated acids in which the α-carbon atom is substituted by an alkyl group, such as methyl, ethyl, propyl, or isopropyl, of which methyl methacrylate, methyl ethacrylate and methyl α-propylacrylate are typical, are more difficult to aminolyze and when an amine containing a primary nitrogen atom is used, it is difficult to get aminolysis of 60% to 100% of the ester groups without cross-linking. Generally, however, the aminolysis may be effected at temperatures of 180° to 200° C. for three to seven hours with production of uncross-linked products which are up to 60% aminolyzed. Generally to get a larger proportion of the ester groups or all thereof in the polymer aminolyzed, a 5-to-10 fold excess of amine may be reacted at a temperature of 130° C. for a time of from four to seven days. Alternatively, an alkoxide catalyst may be used with 2-to-4 fold excess amine or an amount of amine equivalent to the ester groups to be aminolyzed may be used at 130° C.

As the alkyl substituent on the α-carbon of the acrylic acid increases in size, more drastic conditions are generally required. Similarly, as the alkyl group of the ester increases in size, more drastic conditions are necessary to effect aminolysis: thus, when polymerized methyl methacrylate is replaced with polymerized ethyl methacrylate, longer times and higher temperature must be used. As already stated, imide formation may be prevented by the use of amines which contain a secondary nitrogen atom but no primary nitrogen atom.

The difference in reactivity of these various esters makes it possible to obtain for all practical purposes a selective aminolysis of copolymers containing different ester units. For example, when the final quaternary ammonium compound desired to be produced is one containing methyl methacrylate as comonomer units, a coplymer of methyl methacrylate with at least 5 mole percent of methyl acrylate may serve as a starting material so that aminolysis converts the ester groups of the methyl acrylate units to amide units without affecting the ester units of the methyl methacrylate to any considerable exent. Such an aminolysis, for example, may be effected at 80° to 120° C. in the presence of an amount of an amine mixture which is equivalent to the ester groups in the methyl acrylate portion of the copolymer. Similarly, if it is desired to produce a copolymer containing quaternary ammonium groups with one or more comonomers of non-ester type listed hereinabove such as of styrene, a corresponding copolymer, as of styrene and methyl acrylate, may be used as the starting material in which the proportion of acrylate units corresponds to the number of acrylamide units desired and all such acrylate units may be converted to amide groups in the aminolysis.

To produce polymers of Formula I, the alkoxymethyl derivatives of α-chloroacetamide may be used to quaternize an amine of formula III, after which the resulting monomer is polymerized or copolymerized.

The new polymers may be made by first quaternizing an amine of formula III with α-chloroacetamide, polymerizing or copolymerizing the monomer and then reacting the polymer with alcoholic formaldehyde. If desired, the reaction with the formaldehyde and alcohol may be effected on the quaternized monomer before polymerization. Reaction with formaldehyde in an aqueous medium may be effected readily on the alkaline side between pH of 9 to 10. The reaction is generally carried out in the presence of 1 to 3 moles of formaldehyde per amide group, an alkali metal hydroxide being employed to provide the necessary pH value. The reaction with formaldehyde may be effected in the presence of a lower alcohol, to provide the alkoxymethyl derivative, at a temperature of 60° to 80° C. for one-half to two hours. Alkoxymethylation may be effected in two stages wherein the first stage is carried out under alkaline conditions at the pH mentioned above and the second stage is effected under acid conditions at a pH between 3 and 4.

The new polymeric compounds are viscous to solid resinous materials of water-soluble character or at least readily water-dispersible character. They are generally also soluble in organic solvents of polar type, such as alcohols, especially the lower alcohols, methanol, ethanol, propanol, isopropanol and the butyl alcohols, and also in acetonitrile, dimethylformamide and so on. When the polymers are free of units containing carboxyl or free amine groups, they are generally substantially neutral. The polymeric compounds of the present invention can be isolated by any of numerous conventional procedures, such as by freeze-drying, evaporation of solvents from the reaction mixtures containing them, or the like.

The alkoxymethylated derivatives (both monomeric and polymeric) of the present invention are preferable to the simple methylolated derivatives in which $R^3$ would be replaced by H in that the former are more stable under normal conditions of storage.

The polymers of the present invention contain alkoxymethyl, such as methoxymethyl, groups by virtue of which they contain a reactive element adapting them to be converted into durable components of any system to which they are applied. Thus, these readily water-dispersible polymeric compounds are easily applied through aqueous or alcoholic media to various substrates including those of paper, leather, textiles or the like and are adapted to be converted to insoluble condition merely by heating preferably in the presence of an acidic catalyst which may be incorporated onto the substrate at the same time as it is impregnated with the polymeric compounds of the present invention. Thus, substrates of wool, cellulose, rayon, cellophane, cotton, cellulose esters, such as cellulose acetate or cellulose acetate butyrate, polyvinyl alcohols, polyamides of the nylon type, homopolymers or copolymers of acrylamide or methacrylamide, may be impregnated or coated with solutions of the polymers of the present invention and a small amount, from ½% to 2%, on the weight of the compound of the present invention, of an acidic catalyst and after drying, the treated substrate may be subjected to baking or curing operations in which the polymer applied is converted to an insoluble condition which may or may not involve reaction with the substrate as well. As an acidic catalyst there may be used hydrochloric acid, sulfuric acid, phosphoric acid, oxalic acid, ammonium phosphate, ammonium thiocyanate, hydrochloric or other acid salts of a hydroxy aliphatic amine including 2-methyl-2-amino-1-propanol, 2-methyl-2-amino-1,3-propandiol, tris(hydroxymethyl)-aminomethane, 2-phenyl-2-amino-1-propanol, 2-methyl-2-amino-1-pentanol, 2-aminobutanol, triethanolamine, 2-amino-2-ethyl-1-butanol, also ammonium chloride, pyridine hydrochloride, benzyl dimethylamine oxalate.

Thus, the compounds may be applied to hydrophobic textile materials of the types mentioned above in an amount of 2% to 10% on the weight of the textile material to provide an antistatic finish which can be converted to insoluble condition by drying and baking or curing at a temperature of 240° to 450° F. for periods of time which are inversely proportional to the temperature, such as for a period of about 30 minutes at 240° F., about 10 minutes at 300° F., and 15 to 30 seconds at 450° F. When the polymers comprise a hydrophobic component, they may be applied in aqueous solution to a textile, leather or the like, and after curing they may serve to impart water-repellency or water-proofing characteristics depending upon the extent of hydrophobicity of the polymer. The compounds may be applied to hydrophilic material, such as cotton and wool to modify the physical and chemical properties thereof, either in the form of yarns or fabrics. Thus, they may modify the feel, generally improving the softness thereof; the dyeability, generally increasing the affinity of the textile to certain types of dyes; or they may be applied to impart improved dimensional stability and resistance to shrinkage on washing of the fabrics, or to increase the resistance to creasing.

For the application to textiles, the compounds of the present invention may be combined with auxiliary agents, such as those of aminoplast types, particularly the water-soluble urea-formaldehyde, triazine-formaldehyde, such as melamine-formaldehyde, heat-convertible condensates, especially where increased stiffness or resistance to creasing is desired.

In the following examples, which are illustrative of the present invention, the parts and percentages are by weight unless otherwise specified:

EXAMPLE 1

A mixture of 115 grams of poly(β-dimethylaminoethyl vinyl ether), 300 ml. of methanol and 140 grams (a molar equivalent) of N-methoxymethyl-α-chloroacetamide is heated at reflux for 6 hours. The product is a polymer comprising units having Formula V:

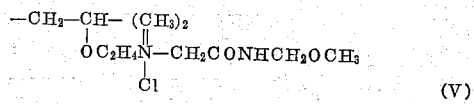

EXAMPLE 2

The product obtained in Example 1 is diluted with water to give a solution containing 5% of active polymeric material and 0.5% by weight of solution of ammonium chloride is added. A nylon fabric is padded through so as to retain about 35% of the quaternary in solution. The fabric is air-dried and cured for 10 minutes at 300° F. The fabric is effectively protected against the development of static charge and retains this protection after five full soap wash cycles in a launderometer. This treatment is similarly employed and effective with polyester (polyethylene terephthalate), polyacrylonitrile and cellulose acetate fabrics in conferring antistatic properties thereto.

EXAMPLE 3

(a) The procedure of Example 1 is repeated replacing the N-methoxymethyl-α-chloroacetamide with a molar equivalent of α-chloroacetamide itself. The product is a polymer comprising units of Formula VI:

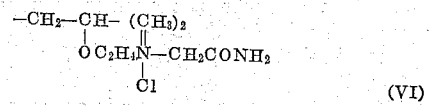

(b) To the polymer solution obtained in part (a) 40 grams of a 55% solution of formaldehyde in methanol is added and the mixture is then adjusted to a pH of 8.5 with sodium methoxide. After heating at 65° C. for 2 hours, the pH is adjusted to 4.0 with phosphoric acid and the batch is heated at reflux for one hour. The pH is adjusted to 7.0 with sodium methoxide and the reaction mass is filtered for clarification, yielding a solution of a methoxymethyl derivative of the polymer containing units of Formula VI.

EXAMPLE 4

(a) The procedure of Example 1 is repeated replacing the vinyl ether with a molarly equivalent amount of poly(N-[3-dimethylaminopropyl]acrylamide). The polymer obtained comprised units having the formula:

$$-CH_2-HC- \quad (CH_3)_2$$
$$\underset{|}{C}ONH(CH_2)_3\overset{||}{N}-CH_2CONHCH_2OCH_3$$
$$Cl \qquad \qquad (VII)$$

(b) The polymer of part (a) is applied to nylon, cellulose acetate, polyethylene terephthalate (Dacron) and polyacrylonitrile fabrics (Orlon) by the procedure of Example 2. Effective antistatic quality of durable character is obtained.

EXAMPLE 5

The copolymer of Example 3 when added to suspensions of 20% carbon black in water in an amount of 0.3% on the weight of carbon black give uniform, stable dispersions.

EXAMPLE 6

The procedure of Example 1 is repeated replacing the vinyl ether therein with 185 grams of poly($\beta$-diethylaminoethyl methacrylate) yielding the corresponding polymer in which about 90% of the amine units are quaternized. It is applied as an antistatic treatment by the procedure of Example 2.

EXAMPLE 7

A mixture of 185 grams of poly(morpholinoethyl acrylate), 400 grams of isopropanol and 180 grams of N-n-butoxymethyl-$\alpha$-chloroacetamide is heated at reflux for six hours, yielding the corresponding polymer in which about 92% of the amine units are quaternized. It is a useful antistatic agent for textiles when applied in the manner described in Example 2.

EXAMPLE 8

(a) A mixture of 197 grams of $\beta$-piperidinopropyl acrylate, 550 ml. of ethanol and 140 grams of N-methoxymethyl-$\alpha$-chloroacetamide is heated at reflux for one hour.

(b) The quaternized monomer solution obtained in part (a) is mixed with 200 grams of ethyl acrylate. Then 11 grams of azodiisobutyronitrile is added and copolymerization is effected by heating at 60° C. for 16 hours in an inert atmosphere of nitrogen. The solution is then diluted with water to a concentration of 2% by weight and the copolymer is then applied, as on a textile pad, to textile fabrics of cellulose acetate, polyacrylonitrile, and poly(ethylene terephthalate) in such a way as to provide about 100% wet pick-up. After air-drying, the treated fabric is heated at 300° F. for 10 minutes. The antistatic treatment is resistant to laundering.

EXAMPLE 9

(a) A mixture of 268 grams of N-(10-dimethylaminodecyl)-methacrylamide, 600 grams of isopropanol, and 140 grams of N-ethoxymethyl-$\alpha$-chloroacetamide is heated at reflux for two hours.

(b) The quaternized monomer solution obtained in part (a) is mixed with 75 grams of vinyl acetate and 50 grams of n-butyl acrylate. Then 12 grams of azodiisobutyronitrile is added and copolymerization is effected by heating at 60° C. for 16 hours in an inert atmosphere of nitrogen. The solution is then diluted with water to a concentration of 2% by weight and the copolymer is then applied, as on a textile pad, to textile fabrics of cellulose acetate, polyacrylonitrile, and poly(ethylene terephthalate) in such a way as to provide about 100% wet pick-up. After air-drying, the treated fabric is heated at 300° F. for 10 minutes. The antistatic treatment is resistant to laundering.

EXAMPLE 10

(a) One mole (94 grams) of $\alpha$-chloroacetamide is dissolved in 300 ml. of a 30% solution of formaldehyde in methanol adjusted to a pH of 8.0 with sodium hydroxide. The resulting solution is heated at 55 to 60° C. for 30 minutes. The pH is adjusted to 4.0 with phosphoric acid and then the batch is heated another hour at reflux. About 95% of the chloroacetamide is converted to the methoxymethyl derivative as measured by titration with sodium sulfite at 0 to 5° C.

(b) To the solution obtained in part (a) there is added a copolymer of 95 mole percent of vinyl pyrrolidone with 5 mole percent of 2-dimethylaminooctyl acrylate and the mixture is heated at reflux for 6 hours. The product is a copolymer of 95 mole percent of vinyl pyrrolidone with 5 mole percent of units of the formula $$-CH_2-CH- \quad (CH_3)_2$$
$$\underset{|}{C}OOCH_2CH(C_6H_{13})\overset{||}{N}-CH_2CONCH_2OCH_3$$
$$Cl$$

EXAMPLE 11

(a) Two moles (371 grams) of benzyltrimethylammonium chloride and 400 ml. of methanol are added to a solution prepared as in Example 10(a) containing one mole of N-ethoxymethylchloroacetamide. Then there is added to this solution 685 grams of a copolymer of 50 mole percent of dimethylaminoethyl acrylate and 50 mole percent of methyl acrylate and 300 ml. of methanol. The mixture is then heated at reflux for six hours resulting in quaternization of about 85% of the amine-containing units of the copolymer.

We claim:

1. A monomeric compound of the formula $$H_2C=CR \quad R' \;\; R^2$$
$$\underset{|}{Y}-A-\overset{|}{\underset{|}{N}}\diagdown$$
$$X \quad CH_2CONHCH_2OR^3$$

where R is selected from the group consisting of hydrogen and methyl,
Y is selected from the group consisting of O, —CONR—, and —COO—,
A is an alkylene group having 2 to 10 carbon atoms, at least two of the carbon atoms thereof being connected in a chain extending between the N atom and the Y group,
R' and R² are selected from the group consisting of
  (1) separate groups selected individually from the group consisting of saturated and ethylenically unsaturated hydrocarbon groups of 1 to 4 carbon atoms, and (2) a composite group selected from the group consisting of the morpholino residue, the pyrrolidino residue, the piperidino residue, and an N-alkyl piperazino residue of the formula : $(C_2H_4)_2$:$NR^4$ where $R^4$ is an alkyl group of 1 to 18 carbon atoms,
X is a halogen atom, and
R³ is an alkyl group having from 1 to 4 carbon atoms.

2. A water-soluble polymer of monoethylenically unsaturated monomers comprising at least 5 mole percent of at least one monomer of the formula $$H_2C=CR \quad R' \;\; R^2$$
$$\underset{|}{Y}-A-\overset{|}{\underset{|}{N}}\diagdown$$
$$X \quad CH_2CONHCH_2OR^3$$

where R is selected from the group consisting of hydrogen and methyl,

Y is selected from the group consisting of O, —CONR—, and —COO—,

A is an alkylene group having 2 to 10 carbon atoms, at least two of the carbon atoms thereof being connected in a chain extending between the N atom and the Y group, R' and R² are selected from the group consisting of (1) separate groups selected individually from the group consisting of saturated and ethylenically unsaturated hydrocarbon groups of 1 to 4 carbon atoms, and (2) a composite group selected from the group consisting of the morpholino residue, the pyrrolidino residue, the piperidino residue, and an N-alkyl piperazino residue of the formula $$:(C_2H_4)_2:NR^4$$

where R⁴ is an alkyl group of 1 to 18 carbon atoms,

X is a halogen atom, and

R³ is an alkyl group having from 1 to 4 carbon atoms.

3. A water-soluble polymer as defined in claim 2, said polymer comprising at least 30 mole percent of units containing quaternary ammonium nitrogen.

4. A water-soluble polymer as defined in claim 2 comprising at least 30 mole percent of at least one monomer of the formula mentioned.

5. A monomeric compound of the formula $$H_2C=CH\text{—}O\text{—}A\text{—}\underset{X}{\overset{R'\ R^2}{N}}\diagdown CH_2CONHCH_2OR_2$$

where A is an alkylene group having 2 to 10 carbon atoms, at least two of the carbon atoms thereof being connected in a chain extending between the N atom and the O atom, R' is an alkyl group having 1 to 4 carbon atoms, R² is an alkyl group having 1 to 4 carbon atoms, R³ is an alkyl group having 1 to 4 carbon atoms, and X is a halogen atom.

6. A monomeric compound of the formula $$H_2C=\underset{(CH_2)_{n-1}H}{\overset{O}{C}}\text{—}\overset{\|}{C}\text{—}O\text{—}A\text{—}\underset{X}{\overset{R'\ R^2}{N}}\diagdown CH_2CONHCH_2OR_2$$

where n is an integer having a value of 1 to 2,

A is an alkylene group having 2 to 10 carbon atoms, at least two of the carbon atoms thereof being connected in a chain extending between the N atom and the O atom, R' is an alkyl group having 1 to 4 carbon atoms, R² is an alkyl group having 1 to 4 carbon atoms, R³ is an alkyl group having 1 to 4 carbon atoms, and X is a halogen atom.

7. A monomeric compound of the formula $$H_2C=\underset{(CH_2)_{n-1}H}{\overset{O}{C}}\text{—}\overset{\|}{C}\text{—}NH\text{—}A\text{—}\underset{X}{\overset{R'\ R^2}{N}}\diagdown CH_2CONHCH_2OR_2$$

where n is an integer having a value of 1 to 2,

A is an alkylene group having 2 to 10 carbon atoms, at least two of the carbon atoms thereof being connected in a chain extending between the N atoms, R' is an alkyl group having 1 to 4 carbon atoms, R² is an alkyl group having 1 to 4 carbon atoms, R³ is an alkyl group having 1 to 4 carbon atoms, and X is a halogen atom.

8. A water-soluble polymer of monoethylenically unsaturated monomers comprising at least 5 mole percent of a monomer having the formula $$H_2C=C(H)OA\underset{X}{\overset{R'\ R^2}{N}}\diagdown CH_2CONHCH_2OR^3$$

where A is an alkylene group having 2 to 10 carbon atoms, at least two of the carbon atoms thereof being connected in a chain between the N and O atoms, R' is a saturated hydrocarbon group of 1 to 4 carbon atoms, R² is a saturated hydrocarbon group of 1 to 4 carbon atoms, R³ is an alkyl group having 1 to 4 carbon atoms, and X is a halogen atom.

9. A water-soluble polymer of monoethylenically unsaturated monomers comprising at least 5 mole percent of a monomer having the formula $$H_2C=C(H)\overset{O}{\overset{\|}{C}}NHA\underset{X}{\overset{R'\ R^2}{N}}\diagdown CH_2CONHCH_2OR^3$$

where A is an alkylene group having 2 to 10 carbon atoms, at least two of the carbon atoms thereof being connected in a chain between the N and O atoms, R' is a saturated hydrocarbon group of 1 to 4 carbon atoms, R² is a saturated hydrocarbon group of 1 to 4 carbon atoms, R³ is an alkyl group having 1 to 4 carbon atoms, and X is a halogen atom.

10. A water-soluble polymer of monoethylenically unsaturated monomers comprising at least 5 mole percent of a monomer having the formula $$H_2C=C(H)OC_2H_4\underset{Cl}{N}(CH_3)_2CH_2CONHCH_2OCH_3$$

11. A water-soluble polymer of monoethylenically unsaturated monomers comprising at least 5 mole percent of a monomer having the formula $$H_2C=C(H)CONH(CH_2)_3\underset{Cl}{N}(CH_3)_2CH_2CONHCH_2OCH_3$$

References Cited in the file of this patent

UNITED STATES PATENTS

| | | |
|---|---|---|
| 2,871,223 | Hankins et al. | Jan. 27, 1959 |
| 2,940,944 | Christensen | June 14, 1960 |
| 3,037,963 | Christensen | June 5, 1962 |

FOREIGN PATENTS

| | | |
|---|---|---|
| 515,194 | Belgium | Feb. 16, 1953 |

UNITED STATES PATENT OFFICE
CERTIFICATE OF CORRECTION

Patent No. 3,170,901 February 23, 1965

Sidney Melamed et al.

It is hereby certified that error appears in the above numbered patent requiring correction and that the said Letters Patent should read as corrected below.

Column 9, lines 27 to 30, 39 to 42 and lines 53 to 56, in the last line of each of the formulas, each occurrence, for the lines of symbols reading:

$$\diagdown CH_2 CONHCH_2 OR_2$$

read $$\diagdown CH_2 CONHCH_2 OR^3$$

Signed and sealed this 13th day of July 1965.

(SEAL)
Attest:

ERNEST W. SWIDER
Attesting Officer

EDWARD J. BRENNER
Commissioner of Patents